United States Patent
Nishino et al.

(10) Patent No.: US 9,177,556 B2
(45) Date of Patent: Nov. 3, 2015

(54) SOUND ANALYSIS APPARATUS FOR DETECTING SOUND SOURCES

(71) Applicant: FUJI XEROX CO., LTD., Tokyo (JP)

(72) Inventors: Yohei Nishino, Kanagawa (JP); Haruo Harada, Kanagawa (JP); Hirohito Yoneyama, Kanagawa (JP); Kei Shimotani, Kanagawa (JP); Akira Fujii, Kanagawa (JP); Kiyoshi Iida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 130 days.

(21) Appl. No.: 13/909,520

(22) Filed: Jun. 4, 2013

(65) Prior Publication Data
US 2014/0108011 A1     Apr. 17, 2014

(30) Foreign Application Priority Data

Oct. 11, 2012    (JP) .................................. 2012-226350

(51) Int. Cl.
| | |
|---|---|
| *G01S 3/80* | (2006.01) |
| *G10L 17/00* | (2013.01) |
| *G10L 25/51* | (2013.01) |
| *G01S 3/808* | (2006.01) |
| *G01S 5/28* | (2006.01) |
| *G01S 11/14* | (2006.01) |

(52) U.S. Cl.
CPC . *G10L 17/00* (2013.01); *G01S 3/80* (2013.01); *G01S 3/8083* (2013.01); *G01S 5/28* (2013.01); *G01S 11/14* (2013.01); *G10L 25/51* (2013.01)

(58) Field of Classification Search
USPC ........................... 704/213; 381/92, 303; 701/3
See application file for complete search history.

(56) References Cited

U.S. PATENT DOCUMENTS

| | | | |
|---|---|---|---|
| 2008/0144864 A1* | 6/2008 | Huon ............................ | 381/305 |
| 2009/0086993 A1* | 4/2009 | Kawaguchi et al. ............ | 381/92 |
| 2010/0008516 A1* | 1/2010 | Ichikawa et al. ............... | 381/92 |
| 2011/0110531 A1* | 5/2011 | Klefenz et al. .................. | 381/92 |
| 2012/0295637 A1* | 11/2012 | Hannuksela et al. ...... | 455/456.1 |
| 2013/0317669 A1* | 11/2013 | Jiang et al. ........................ | 701/3 |

FOREIGN PATENT DOCUMENTS

JP      A-2003-337164       11/2003

OTHER PUBLICATIONS

Aoki, et al "Sound source segregation based on estimating incident angle of each frequency component of input signals acquired by multiple microphones", Acoust. Sci & Tech. 2, 2001.*

* cited by examiner

*Primary Examiner* — Jialong He
*Assistant Examiner* — Yi-Sheng Wang
(74) *Attorney, Agent, or Firm* — Oliff PLC

(57) ABSTRACT

A sound analysis apparatus includes a sound information obtaining section chat obtains information relating to a sound acquired by a sound acquiring section that acquires the sound and distinguishes a spoken voice of a wearer from a spoken voice of another person, a phase difference deriving section that derives a relationship between a frequency and a phase difference with respect to the sound acquired by the plural sound acquiring sections, a dispersion deriving section that derives a dispersion that is the level of irregularity of the derived phase difference, and a distance deriving section that derives a distance between the wearer and the other person using a first dispersion derived in a case where the sound is distinguished as the spoken voice of the other person and a second dispersion derived in a case where the sound is distinguished as the spoken voice of the wearer.

5 Claims, 17 Drawing Sheets

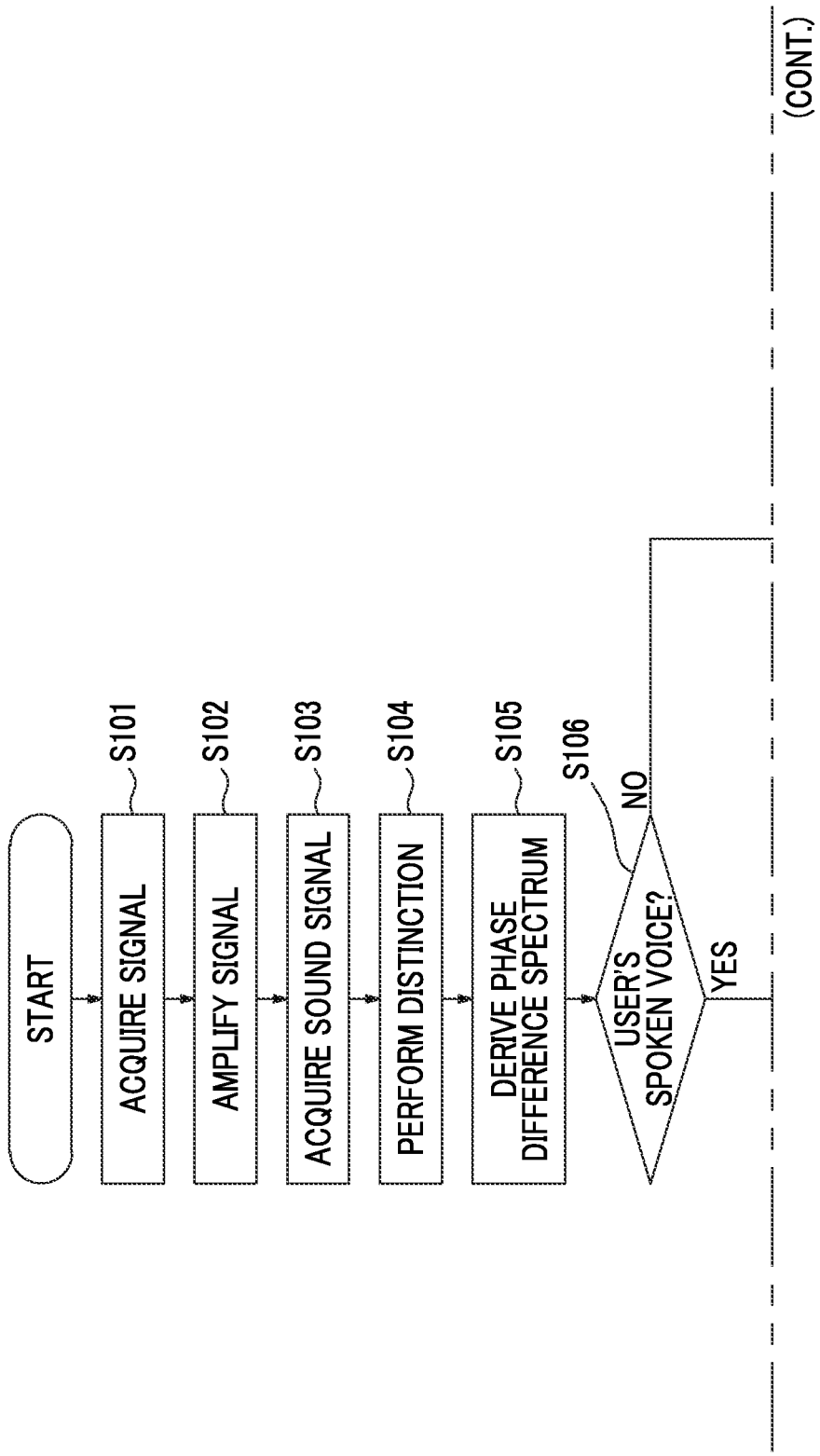

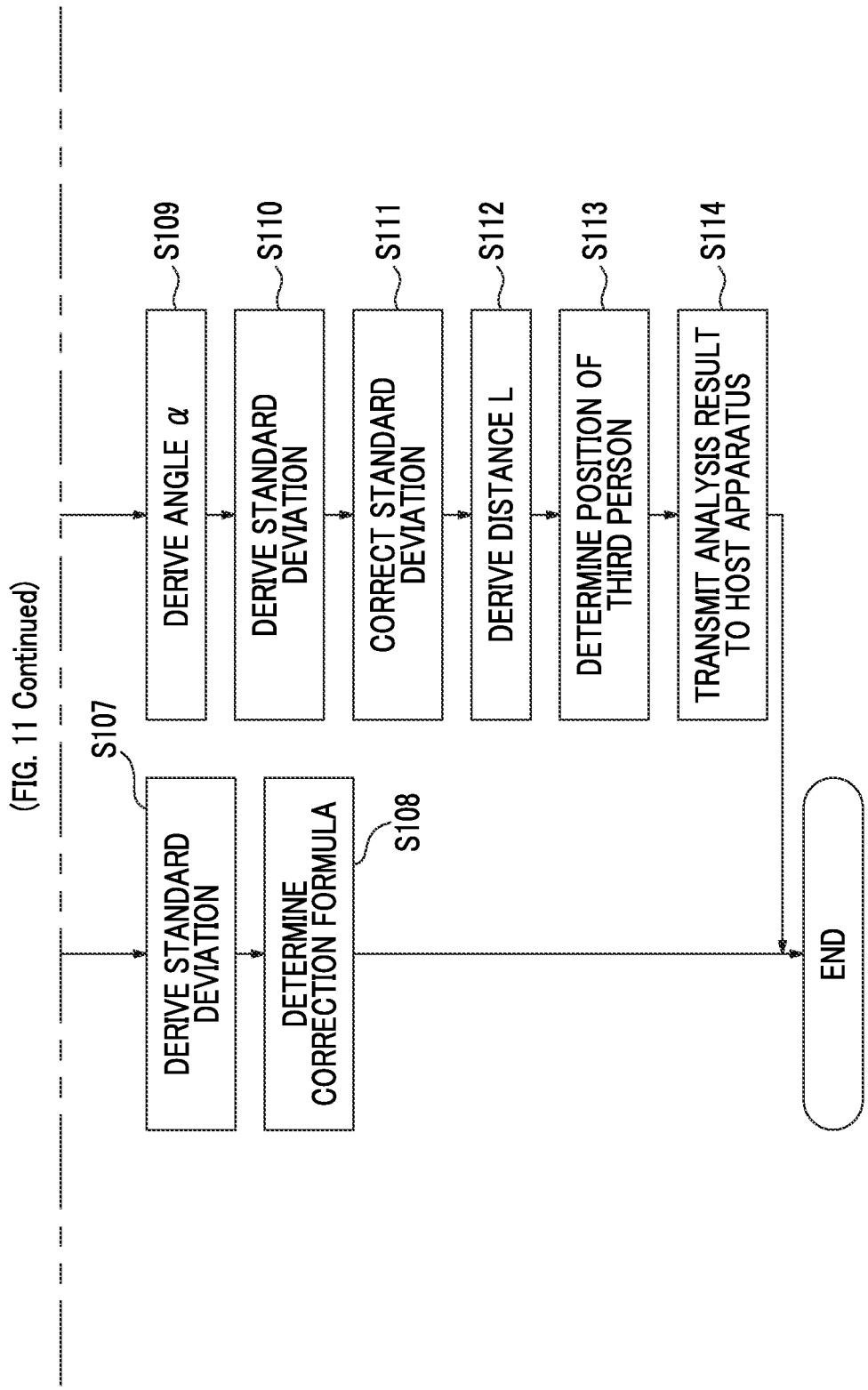

SOUND ANALYSIS APPARATUS FOR DETECTING SOUND SOURCES

CROSS-REFERENCE TO RELATED APPLICATIONS

This application is based on and claims priority under 35 USC 119 from Japanese Patent Application No. 2012-226350 filed Oct. 11, 2012.

BACKGROUND

Technical Field

The present invention relates to a sound analysis apparatus, a sound analysis system, and a non-transitory computer readable medium.

SUMMARY

According to an aspect of the invention, there is provided a sound analysis apparatus including: a sound information obtaining section that obtains information relating to a sound acquired by a sound acquiring section that acquires the sound and distinguishes a spoken voice of a wearer from a spoken voice of another person; a phase difference deriving section that derives a relationship between a frequency and a phase difference with respect to the sound acquired by the plural sound acquiring sections; a dispersion deriving section that derives a dispersion that is the level of irregularity of the phase difference derived by the phase difference deriving section; and a distance deriving section that derives a distance between the wearer and the other person using a first dispersion that is derived by the dispersion deriving section in a case where the sound is distinguished as the spoken voice of the other person and a second dispersion that is derived by the dispersion deriving section in a case where the sound is distinguished as the spoken voice of the wearer.

BRIEF DESCRIPTION OF THE DRAWINGS

Exemplary embodiments of the present invention will be described in detail based on the following figures, wherein:

FIG. 11 is a flowchart showing an operation of a terminal apparatus according to the present exemplary embodiment;

DETAILED DESCRIPTION (First Exemplary Embodiment)

First, detailed configuration and operation according to a first exemplary embodiment will be described.

System Configuration Example

Figure 1:
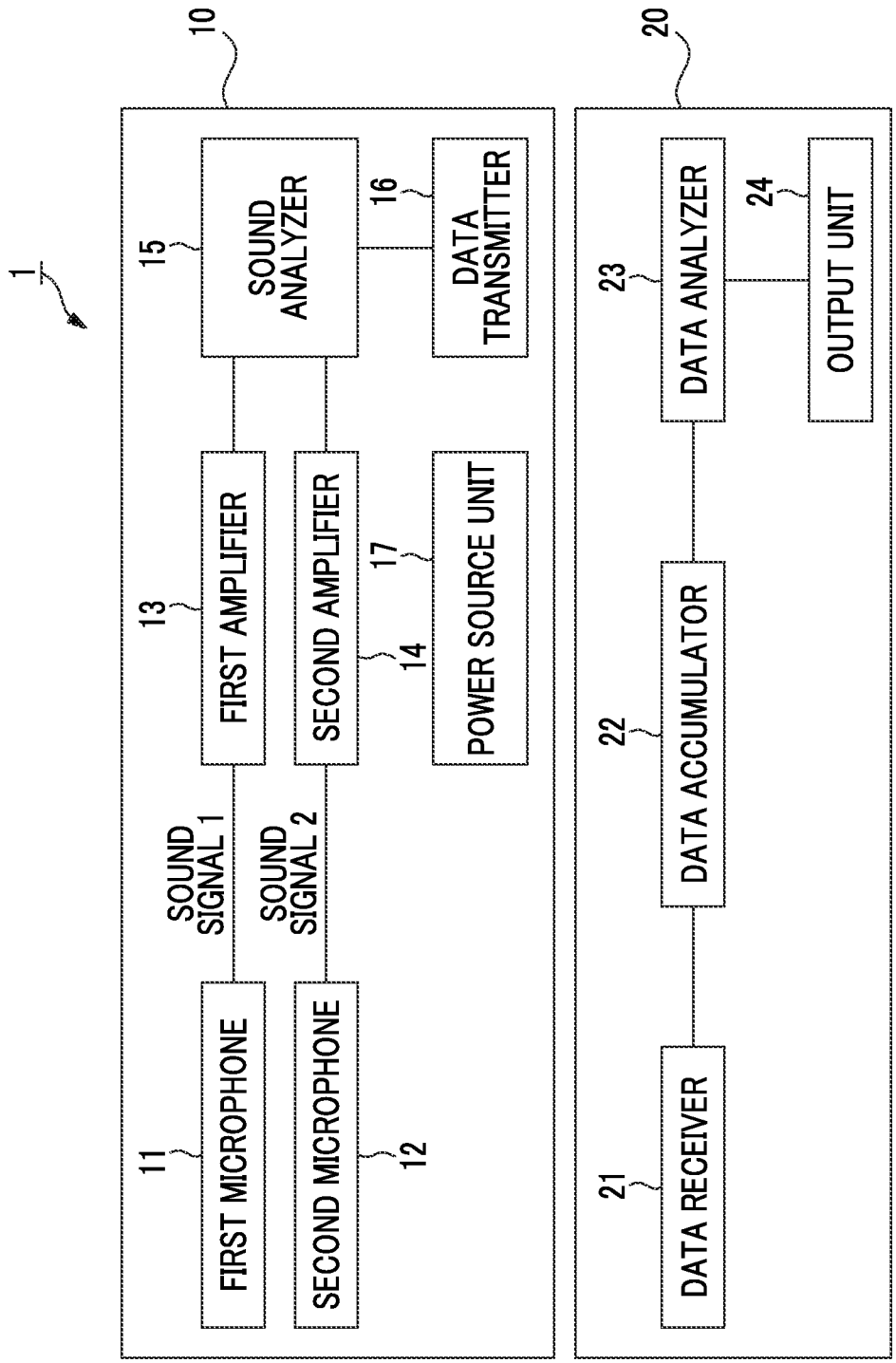
FIG. 1 is a diagram showing a configuration example of a sound analysis system according to a first exemplary embodiment.

FIG. 1 is a diagram illustrating a configuration example of a sound analysis system according to the first exemplary embodiment.

As shown in FIG. 1, a sound analysis system 1 of the present exemplary embodiment includes a terminal apparatus 10 that is an example of a sound analysis apparatus, and a host apparatus 20. The terminal apparatus 10 and the host apparatus 20 are connected to each other through a wireless communication line. As a type of wireless communication line, a line using an existing method such as Wi-Fi (Wireless Fidelity) Bluetooth (registered trademark), ZigBee, or UWB (Ultra Wideband) may be used. Further, only one terminal apparatus 10 is disclosed in the example shown in the figure, but as described later in detail, the terminal apparatus 10 is used by an individual user, and in reality, the terminal apparatuses 10 corresponding to the number of users are prepared. Hereinafter, a person wearing the terminal apparatus 10 is referred to as a wearer.

The terminal apparatus 10 includes plural microphones (a first microphone 11 and a second microphone 12) as a sound acquiring section that distinguishes a wearer's spoken voice and another person's spoken voice, and amplifiers (a first amplifier 13 and a second amplifier 14). Further, the terminal apparatus 10 includes a sound analyzer 15 that analyzes an acquired sound, a data transmitter 16 that transmits the analysis result to the host apparatus 20, and a power source unit 17.

The first microphone 11 and the second microphone 12 are disposed at positions where the distances from a wearer's mouth (utterance portion) to these are different. Here, it is assumed that the first microphone 11 is disposed at a position (for example, about 35 cm) distant from the wearer's mouth (utterance portion), and the second microphone 12 is disposed at a position (for example, about 10 cm) close to the wearer's mouth (utterance portion). As a type of microphone used as the first microphone 11 and the second microphone 12 according to the present exemplary embodiment, various existing types such as a dynamic type or a capacitor type may be used. Particularly, a non-directional MEMS (Micro Electro Mechanical Systems) microphone is preferable.

The first amplifier 13 and the second amplifier 14 amplify electric signals (sound signals) output according to a sound acquired by the first microphone 11 and the second microphone 12, respectively. As an amplifier used as the first amplifier 13 or the second amplifier 14 according to the present exemplary embodiment, an existing operational amplifier or the like may be used.

The sound analyzer 15 analyzes the sound signals from the first amplifier 13 and the second amplifier 14. Further, the sound analyzer 15 analyzes the sound acquired by the first microphone 11 and the second microphone 12 to distinguish whether the sound is a sound uttered by a wearer wearing the terminal apparatus 10 or a sound uttered by another person. Further, the sound analyzer 15 derives the position of the other person with respect to the wearer. Content for a specific process for sound distinction and for derivation of the position of the other person will be described later.

The data transmitter 16 transmits data that includes the analysis result in the sound analyzer 15 and a terminal ID to the host apparatus 20 through the wireless communication line. Information transmitted to the host apparatus 20 may include, for example, information such as a sound acquisition time in the first microphone 11 and the second microphone 12 and a sound pressure of the acquired sound, in addition to the analysis result, according to the content of the process performed in the host apparatus 20. Further, a data accumulator that accumulates the analysis result in the sound analyzer 15 may be provided in the terminal apparatus 10, to transmit data that is stored for a certain period of time in a batch manner. The data may be transmitted by a wired line.

The power source unit 17 supplies electric power to the first microphone 11, the second microphone 12, the first amplifier 13, the second amplifier 14, the sound analyzer 15 and the data transmitter 16. As the power source, for example, an existing power source such as a dry cell or a battery charger may be used. Further, the power source unit 17 includes a known circuit, such as a voltage converter circuit or a charge control circuit as necessary.

The host apparatus 20 includes a data receiver 21 that receives data transmitted from the terminal apparatus 10, a data accumulator 22 that accumulates the received data, a data analyzer 23 that analyzes the stored data, and an output unit 24 that outputs the analysis result. The host apparatus 20 is realized by an information processing apparatus such as a personal computer. Further, in the above-described exemplary embodiment, the plural terminal apparatuses 10 may be used, and in this case, the host apparatus 20 receives data from each of the plural terminal apparatuses 10.

The data receiver 21 corresponds to the above-mentioned wireless line, and receives data from each terminal apparatus 10 and transmits the result to the data accumulator 22. The data accumulator 22 is realized by a storage unit such as a magnetic disk of a personal computer, and accumulates the received data acquired through the data receiver 21 according to respective speakers. Here, distinction of the speakers is performed by the terminal. ID transmitted from the terminal apparatus 10, and verification of a speaker name and a terminal. ID that are registered in the host apparatus 20 in advance. Further, a wearer's state instead of the terminal ID may be transmitted from the terminal apparatus 10.

The data analyzer 23 is realized by a program-controlled CPU of a personal computer, for example, and analyzes the data accumulated in the data accumulator 22. As specific analysis content and analysis method, various contents and methods may be used according to usage purposes or usage types of the system of the present exemplary embodiment. For example, possible to analyze the conversation frequency between wearers of the terminal apparatus 10 or the tendency of conversational partners of each wearer, or to infer the relationship between the wearer and the conversational partners from information about the length of each utterance or sound pressure in their conversation.

The output unit 24 outputs the analysis result in the data analyzer 23, or performs output on the basis of the analysis result. As means for outputting the analysis result or the like, various means such as a display output, a print output using a printer or a sound output may be used according to the content, form or the like of the analysis result.

Configuration Example of Terminal Apparatus

Figure 2:
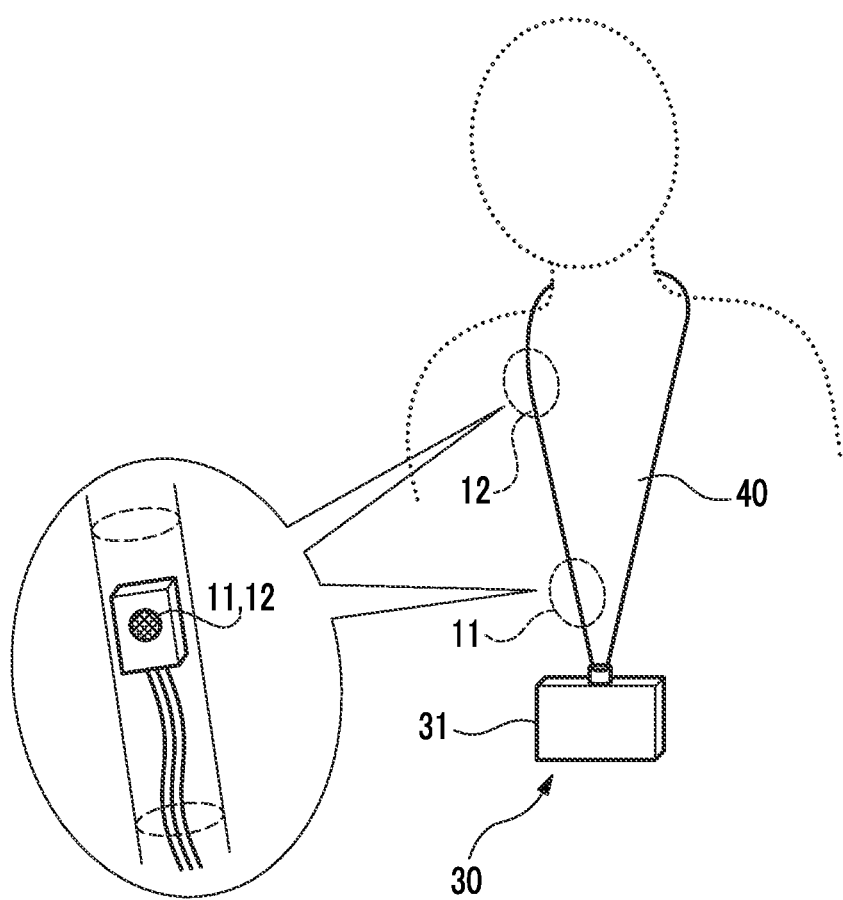
FIG. 2 is a diagram showing a configuration example of a terminal apparatus according to the first exemplary embodiment.

FIG. 2 is a diagram showing a configuration example of the terminal apparatus 10 according to the first exemplary embodiment.

As described above, the terminal apparatus 10 is attached to each user for use. In order to permit a user to wear the terminal apparatus 10, the terminal apparatus 10 of the present exemplary embodiment has a configuration that includes an apparatus body 30 and a strap 40 connected to the apparatus body 30 as shown in FIG. 2 in the configuration shown in the figure, a user is wearing the terminal apparatus 10 with the strap 40 around the neck and the apparatus body 30 hanging from the neck.

The apparatus body 30 has a configuration in which a circuit that realizes at least of the first amplifier 13, the second amplifier 14, the sound analyzer 15, the data transmitter 16 and the power source unit 17, and a power source (battery) of the power source unit 17 are accommodated in a casing 31 of a thin rectangular parallelepiped formed of metal or resin. In the casing 31, a pocket in which an ID card or the like that indicates ID information such as a wearer's name and belonging may be provided. Further, the ID information or the like may be printed on a surface of the casing 31 itself or a seal on which the ID information or the like is written may be attached to the surface of the casing 31.

The first microphone 11 and the second microphone 12 are provided in the strap 40 (hereinafter, in a case where the first microphone 11 and the second microphone 12 are not to be distinguished, the first microphone 11 and the second microphone 12 are referred to as microphones 11 and 12). The microphones 11 and 12 are connected to the first amplifier 13 and the second amplifier 14 accommodated in the apparatus body 30 by a cable (electric cable or the like) that passes through the inside of the strap 40. As the material of the strap 40, various existing materials such as leather, synthetic leather, cotton or other natural fibers, synthetic fibers using resin or the like, or metal may be used. Further, a coating process using silicone resin, a fluorocarbon resin or the like may be performed.

The strap 40 has a cylindrical structure, and the microphones 11 and 12 are accommodated inside the strap 40. By providing the microphones 11 and 12 inside the strap 40, it is possible to prevent damage or contamination of the microphones 11 and 12, and to prevent the speaker from being conscious of the existence of the microphones 11 and 12. The first microphone 11 that is disposed at the position distant from the wearer's mouth (utterance portion) may be provided in the apparatus body 30. In the present exemplary embodiment, an example in which the first microphone 11 is provided in the strap 40 is shown.

Referring to FIG. 2, the first microphone 11 is provided in an end portion of the strap 40 connected to the apparatus body 30 (for example, at a position within 10 cm from a connection portion). Thus, in a state where the wearer wears the strap 40 around the neck to hang the apparatus body 30, the first microphone 11 is disposed at a position separated from the wearer's mouth (utterance portion) by about 30 cm to about 40 cm. Even in a case where the first microphone 11 is provided in the apparatus body 30, the distance from the first microphone 11 to the wearer's mouth (utterance portion) is approximately the same.

The second microphone 12 is disposed at a position separated from the end portion of the strap 40 connected to the apparatus body 30 (for example, at a position separated from the connection portion by about 20 cm to about 30 cm). Thus, in a state where the wearer wears the strap 40 around the neck to hang the apparatus body 30, the second microphone 12 is disposed at the bottom of the neck of the wearer (for example, at a position corresponding to a collarbone), and is disposed at a position separated from the wearer's mouth (utterance portion) by about 10 cm to about 20 cm.

The terminal apparatus 10 of the present exemplary embodiment is not limited to the configuration shown in FIG. 2. For example, it is sufficient if the positional relationship between the first microphone 11 and the second microphone 12 is specified so that the distance of a sound wave arrival path from the first microphone 11 to the wearer's mouth (utterance portion) is approximately several times the distance of a sound wave arrival path from the second microphone 12 to the wearer's mouth (utterance portion). Accordingly, the first microphone may be provided in the strap 40 on the back side of the neck. Further, the microphones 11 and 12 are not limited to the configuration provided in the above-described strap 40, and may be worn by various methods. For example, the first microphone 11 and the second microphone 12 may be configured to be individually fixed to clothes using a pin or the like. Further, an exclusive mounting fixture designed so that the positional relationship between the first microphone 11 and the second microphone 12 is fixed at desired positions may be prepared and mounted.

Further, the apparatus body 30 is not limited to the configuration as shown in FIG. 2 in which the apparatus body 30 is connected to the strap 40 to be carried by the neck of she wearer, and may be configured as an apparatus that is easily carried. For example, the apparatus body 30 may be mounted to clothes or one's body using a clip or a belt, instead of the strap as in the present exemplary embodiment, or may be simply contained in a pocket for carriage. Further, a mobile phone or other existing mobile electronic information terminals may be provided with the functions of receiving, amplifying and analyzing sound signals from the microphones 11 and 12.

In addition, the microphones 11 and 12 and the apparatus body 30 (or the sound analyzer 15) may be connected in a wireless communication manner, instead of being connected by wire. The first amplifier 13, the second amplifier 14, the sound analyzer 15, the data transmitter 16 and the power source unit 17 are accommodated in one case 31 in the above-described configuration example, but may be configured as plural individual bodies. For example, a configuration that is connected to an external power source for use without accommodation of the power source unit 17 in the casing 31 may be used.

Detailed Description about Sound Analyzer 15

Next, the sound analyzer 15 will be described in detail.

Figure 3:
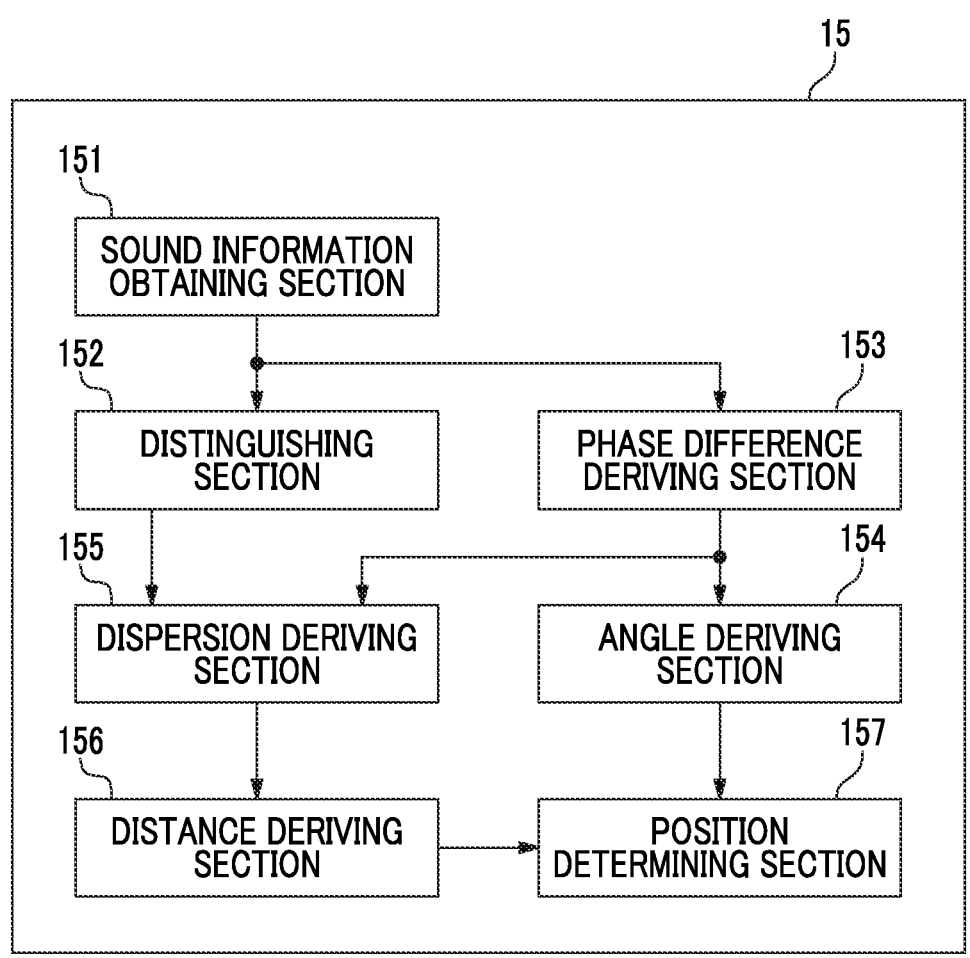
FIG. 3 is a diagram showing a sound analyzer.

FIG. 3 is a diagram showing the sound analyzer 15.

As shown in the figure, the sound analyzer 15 of the present exemplary embodiment includes a sound information obtaining section 151, a distinguishing section 152, a phase difference deriving section 153, an angle deriving section 154, a dispersion deriving section 155, a distance deriving section. 156, and a position determining section 157.

The sound information obtaining section 151 obtains information relating to the sound acquired by the microphones 11 and 12. In the present exemplary embodiment, the sound information obtaining section 151 obtains sound signals that are obtained by the microphones 11 and 12 and are amplified by the first amplifier 13 and the second amplifier 14 (see FIG. 1).

Distinction of Speaker Based on Nonverbal Information about Acquired Sound

The distinguishing section 152 distinguishes whether the sound acquired by the microphones 11 and 12 is a spoken voice of a wearer or a spoken voice of another person.

A speaker distinction method performed by the distinguishing section 152 will be described hereinafter.

The system of the present exemplary embodiment distinguishes the spoken voice of the wearer of the terminal apparatus 10 (wearer's own spoken voice) or she spoken voice of the other person, using information about the sound acquired by the two microphones 11 and 12 provided in the terminal apparatus 10. In other words, in the present exemplary embodiment, with respect to a speaker of the acquired sound, she distinction is performed. Further, in the present exemplary embodiment, the speaker is distinguished on the basis of non-verbal information such as a sound pressure (sound volume input to the microphones 11 and 12), instead of language information obtained using a morpheme analysis or dictionary information, in the obtained sound information. In other words, the speaker of the sound is distinguished from an utterance situation specified by the non-verbal information, instead of the utterance content specified by the language information.

As described referring to FIGS. 1 and 2, in the present exemplary embodiment, the first microphone 11 of the terminal apparatus 10 is disposed at the position distant from the wearer's mouth (utterance portion), and the second microphone 12 is disposed at the position close to the wearer's mouth (utterance portion). That is, if the wearer's mouth (utterance portion) is a sound source, the distance between the first microphone 11 and the sound source, and the distance between the second microphone 12 and the sound source are greatly different from each other. Specifically, the distance between the first microphone 11 and the sound source is about 1.5 to 4 times the distance between the second microphone 12 and the sound source. Here, the sound pressure of the sound acquired in the microphones 11 and 12 attenuates (distance attenuation) as the distance between the microphones 11 and 12 and the sound source thereof is increased. Accordingly, with respect to the spoken voice of the wearer, the sound pressure of the sound acquired in the first microphone 11 and the sound pressure of the sound acquired in the second microphone 12 are greatly different from each other.

On the other hand, in a case where the mouth (utterance portion) of another person (other than the wearer) is a sound source, since the other person is separated from the wearer, the distance between the first microphone 11 and the sound source and the distance between the second microphone 12 and the sound source are not greatly different from each other. A difference between the distances may be generated according to the position of the other person with respect to the wearer, but this is different from a case where the wearer's mouth (utterance portion) is the sound source and the distance between the first microphone 11 and the sound source is several times the distance between the second microphone 12 and the sound source. Accordingly, with respect to the spoken voice of the other person, the sound pressure of the sound acquired in the first microphone 11 and the sound pressure of the sound acquired in the second microphone 12 are not greatly different from each other, unlike the case of the spoken voice of the wearer.

Figure 4:
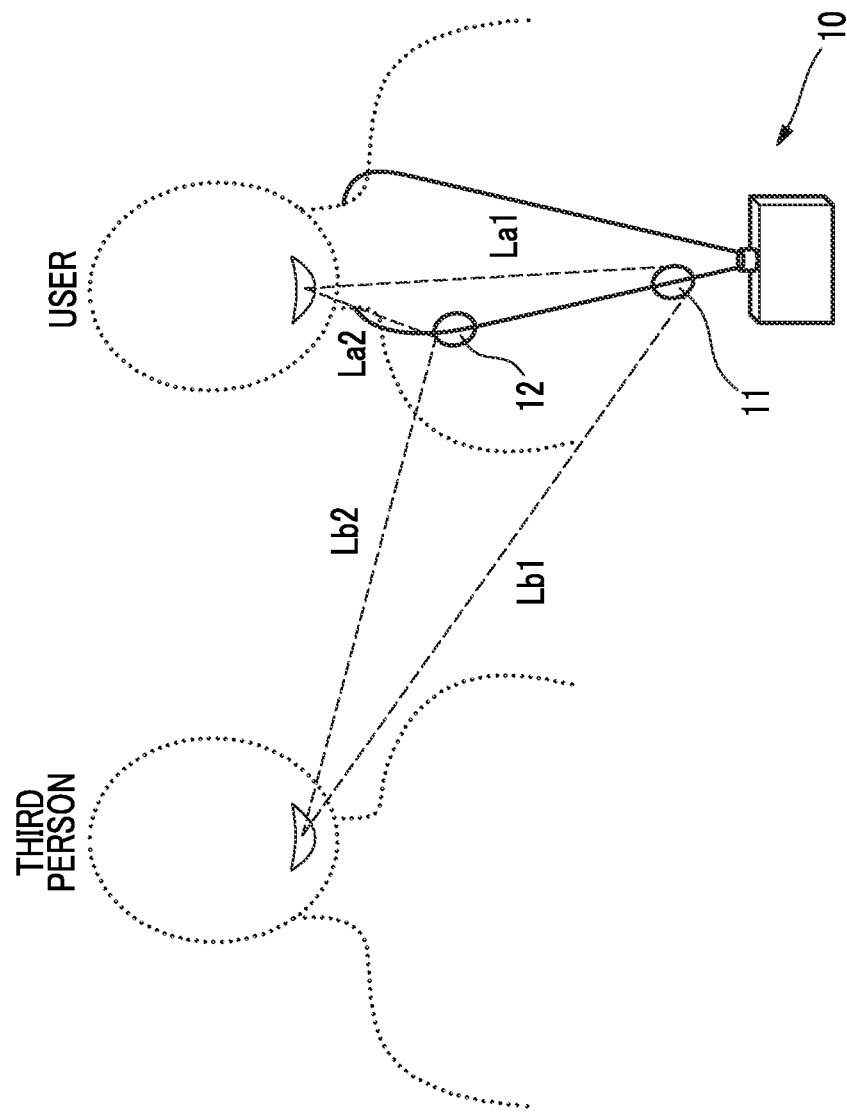
FIG. 4 is a diagram showing; a relationship between mouths (utterance portions) of a wearer and another person and a microphone.

FIG. 4 is a diagram showing a positional relationship between the mouths (utterance portions) of the wearer and another person and the microphones 11 and 12.

In the relationship shown in FIG. 4, a distance between a sound source a that is the wearer's mouth (utterance portion) and the first microphone 11 is set to La1, and a distance between the sound source a and the second microphone 12 is set to La2. Further, a distance between a sound source b that is another person's mouth (utterance portion) and the first microphone 11 is set to Lb1, and a distance between the sound source b and the second microphone 12 is set to Lb2. In this case, the next relationship is established.

$$La1 > La2 (La1 \approx 1.5 \times La2 \text{ to } 4 \times La2)$$

$$Lb1 \approx Lb2$$

Figure 5:
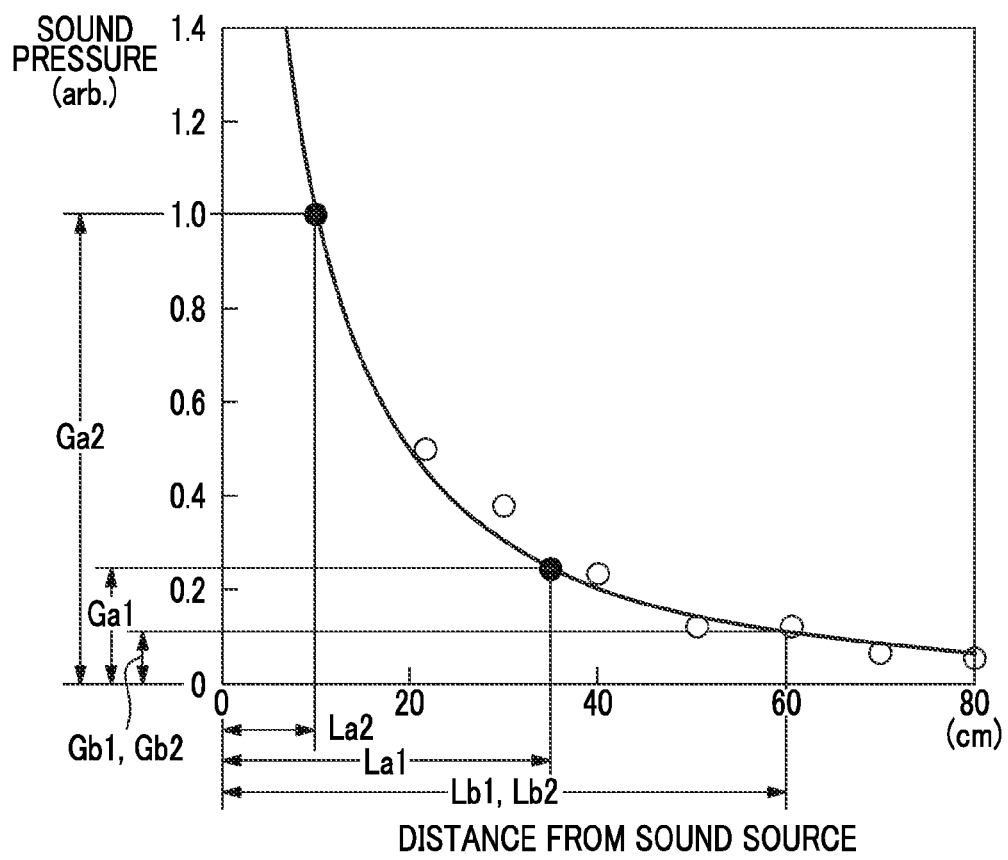
FIG. 5 is a diagram showing a relationship between a distance between a microphone and a sound source, and a sound pressure (input sound volume)

FIG. 5 is a diagram showing a relationship between the distances between the microphones 11 and 12 and a sound source and sound pressures (input sound volumes).

As described above, the sound pressures attenuate according to the distances between the microphones 11 and 12 and the sound source. In FIG. 5, if a sound pressure Ga1 in the case of the distance Pa1 is compared with a sound pressure Ga1 in the case of the distance La2, the sound pressure Ga2 is about ¼ times the sound pressure Ga1. On the other hand, since the distance Lb1 and the distance Lb2 are similar to each other, the sound pressure Gb1 in the case of the distance Phi and the sound pressure Gb2 in the case of the distance Lb2 are approximately the same. Thus, in the present exemplary embodiment, a spoken voice of a wearer and a spoken voice of another person in the acquired sound are distinguished using the sound pressure ratio difference. In the example shown in FIG. 5, the distances Lb1 and Lb2 are set to 60 cm, but it is important in here that the sound pressure Gb1 and the sound pressure Gb2 are approximately the same, and thus, the distances Lb1 and Lb2 are not limited to the values shown in the figure.

Figure 6:
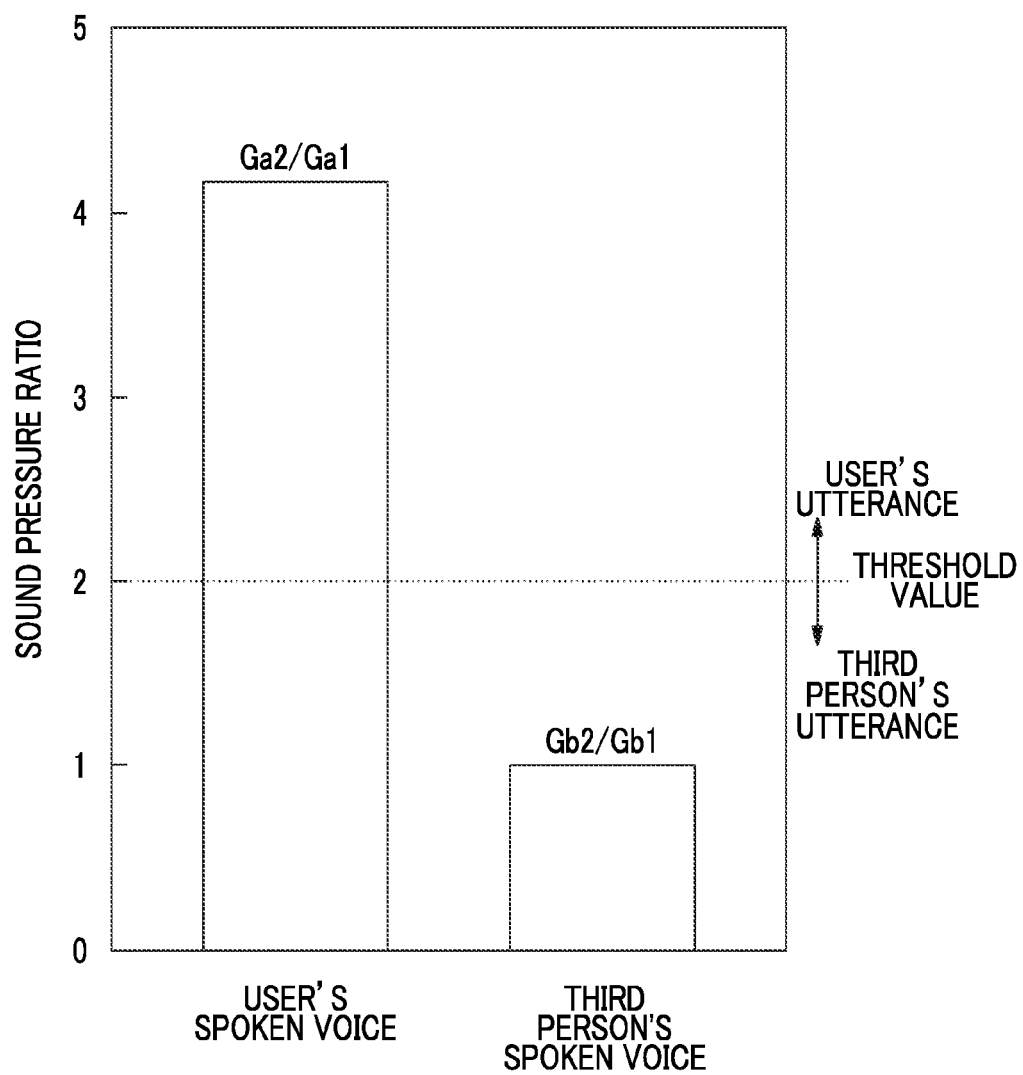
FIG. 6 is a diagram showing a method of distinguishing a wearer's spoken voice and another person's spoken voice.

FIG. 6 is a diagram showing a method of distinguishing the wearer's spoken voice and the other person's spoken voice.

As described referring to FIG. 5, with respect to the spoken voice of the wearer, the sound pressure Ga2 of the second microphone 12 is several times (for example, about 4 times) the sound pressure Ga1 of the first microphone 11. Further, with respect to the spoken voice of the other person, the sound pressure Ga2 of the second microphone 12 is approximately the same as the sound pressure Ga1 of the first microphone 11. Thus, in the present exemplary embodiment, a threshold value is set to the ratio of the sound pressure of the second microphone 12 and the sound pressure of the first microphone 11. Thus, a voice in which the sound pressure ratio is larger than the threshold value is determined as the spoken voice of the wearer, and a voice in which the sound pressure ratio is smaller than the threshold value is determined as the spoken voice of the other person. In the example shown in FIG. 6, the threshold value is 2, and since the sound pressure ratio Ga2/Ga1 is larger than the threshold value 2, the voice is determined as the spoken voice of the wearer, and since the sound pressure ratio Gb2/Gb1 is smaller than the threshold value 2, the voice is determined as the spoken voice of the other person.

However, the sound acquired by the microphones 11 and 12 includes the spoken voice and a so-called noise such as an environmental sound. A distance relationship between a sound source of the noise and the microphones 11 and 12 is similar to the case of the spoken voice of the other person. That is, according to the example shown in FIGS. 5 and 6, if a distance between a noise sound source c and the first microphone 11 is Lc1 and a distance between the noise sound source c and the second microphone 12 is Lc2, the distance Lc1 and the distance Lc2 are similar to each other. Further, the sound pressure ratio Gc2/Gc1 in the sound acquired in the microphones 11 and 12 is smaller than the threshold value of 2. However, the noise may be separated and removed from the spoken voice by performing a filtering process by using an existing technique that uses a band pass filter or a gain filter.

Derivation of Phase Difference Spectrum

The phase difference deriving section 153 derives a relationship between a frequency and a phase difference with respect to a sound acquired in the plural microphones 11 and 12. In the present exemplary embodiment, a phase difference spectrum is derived as the relationship between the frequency and the phase difference of the sound.

Hereinafter, the phase difference spectrum will be described.

Figure 7:
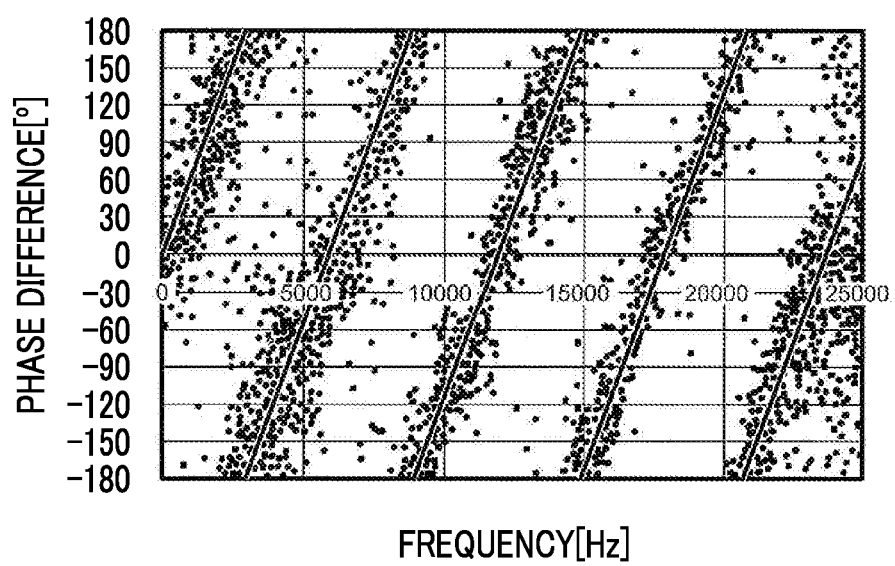
FIG. 7 is a diagram showing a phase difference spectrum.

FIG. 7 is a diagram showing the phase difference spectrum. Here, the transverse axis represents a sound frequency, and the longitudinal axis represents a phase difference.

FIG. 7 is a diagram obtained by plotting the levels of phase differences generated in the microphone 11 and the microphone 12 with respect to sound waves of various frequencies detected in the sound acquired in the microphone 11 and the microphone 12.

In this case, since the sound velocity is constant, if the frequency is changed, the phase difference generated between the microphone 11 and the microphone 12 is generally changed in an approximately linear function relationship with respect to the frequency. However, since the phase difference periodically has values between −180° and 180°, if the frequency is changed, as shown in FIG. 7, a straight line indicated as a thick line in the figure that represents the relationship between the frequency and the phase difference is periodically drawn plural times. Further, the straight line that represents the relationship between the frequency and the phase difference has a predetermined inclination.

In the present exemplary embodiment, using the phase difference spectrum as shown in FIG. 7, a distance and an angle between wearers are derived.

Figure 8:
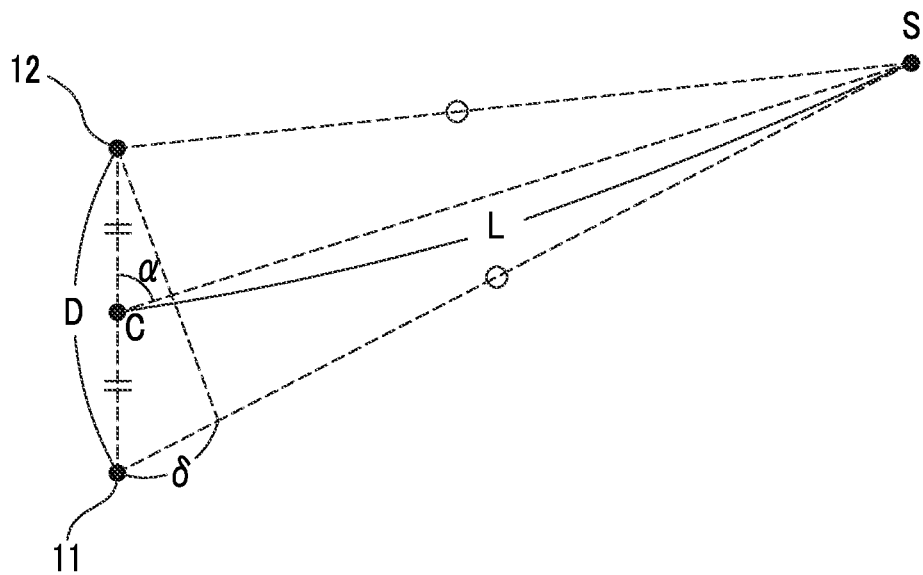
FIG. 8 is a diagram showing a positional relationship between another person's mouth (utterance portion) and a microphone of a terminal apparatus equipped by a wearer.

FIG. 8 is a diagram showing a positional relationship between another person's mouth (utterance portion) S and the microphones 11 and 12 of the terminal apparatus 10 worn by the wearer.

Here, for example, a distance L between the microphones 11 and 12 and the other person's mouth (utterance portion) S and an angle α are defined as shown in FIG. 3. That is, when a median point C of a line that connects the microphone 11 and the microphone 12 that are separated from each other by a distance D is connected to the other person's mouth (utterance portion) 5, the length of a line that connects the median point C and the other person's mouth (utterance portion) S is defined as a distance L. Further, an angle formed by the two lines is defined as the angle α. The angle α represents the direction of the other person with respect to the microphones 11 and 12. Further, the distance IL represents the distance between the wearer and the other person.

In such a configuration, on, the spoken voice generated from the other person's mouth (utterance portion) S is concentrically spread from the point S. Here, since the sound is spread at the sound velocity that is a limited velocity, the time when the spoken voice reaches the first microphone 11 is different from the time when the spoken voice reaches the second microphone 12. Thus, the phase of a sound wave in a predetermined frequency is changed in the first microphone 11 and the second microphone 12, and a phase difference corresponding to a path difference δ of the spoken voice occurs.

Derivation of Angle α

Here, the inclination of the straight line that represents the relationship between the frequency and the phase difference shown in FIG. 7 depends on the angle α. That is, by checking the inclination of the straight line that represents the relationship between the frequency and the phase difference, it is possible to derive the angle α.

In the present exemplary embodiment, the angle deriving section 154 derives an inclination of the straight line that represents the relationship between the frequency and the phase difference from the phase difference spectrum. Thus, the angle deriving section. 154 derives the angle α formed by the wearer and the other person.

Derivation of Distance L

On the other hand, the distance L may be derived by the following method.

Figure 9A:
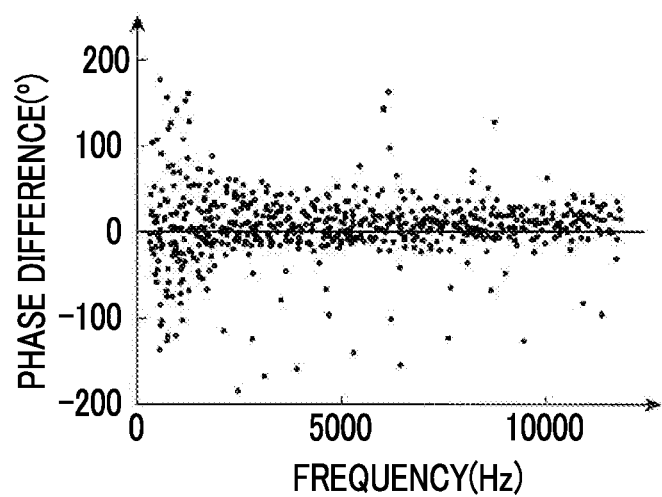
FIGS. 9A to 9C are diagrams showing how irregularity of a phase difference with respect to a frequency is changed according to a distance change.

FIGS. 9A to 9O are diagrams showing how irregularity of a phase difference with respect to a frequency is changed according to change of a distance L. In the figure, the transverse axis represents a sound frequency, and the longitudinal axis represents a phase difference. Here, FIG. 9A corresponds to a case where the distance L is 1 m. Further, FIG. 9B corresponds to a case where the distance L is 2 m in addition, FIG. 9C corresponds to a case where the distance L is 3 m.

Figure 9B:
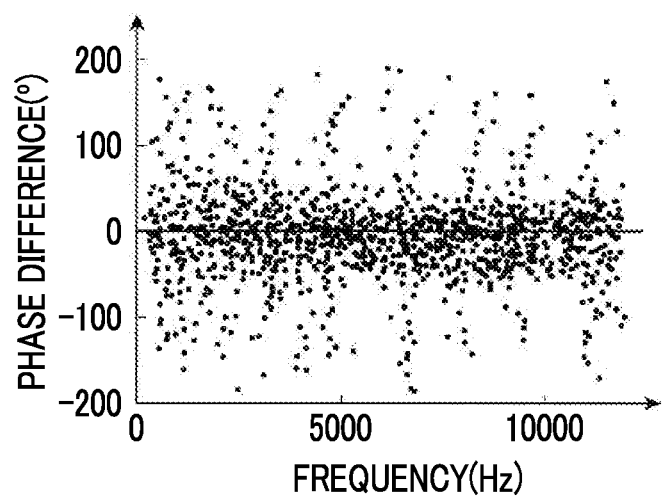
Figure 9C:
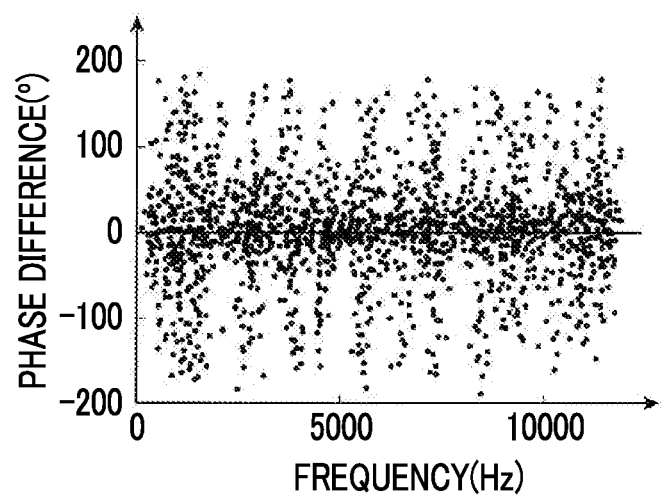

FIGS. 9A to 9C show the phase difference level by which each point plotted in the phase difference spectrum shown in FIG. 7 is separated from the solid line indicated by the linear function. That is, FIGS. 9A to 9C show the level of irregularity of each point plotted in the phase difference spectrum shown in FIG. 7. Further, as is obvious from FIGS. 9A to 9C, as the distance L increases, the level of irregularity of the phase difference increases.

It is considered that this is caused by the influence of a reflected sound reflected from a wall surface, a floor surface or the like. The sound uttered from the other person's mouth (utterance portion) may directly reach the microphones 11 and 12, but may reach the microphones 11 and 12 after being reflected once or plural times on the wall surface, the floor surface or the like. Thus, the sound of the other person acquired by the microphones 11 and 12 is obtained by synthesizing a sound that directly reaches the microphones 11 and 12 and a reflected sound. Here, it is considered that the ratio of the direct sound rather than the reflected sound is large if the distance between the wearer and the other person is short but the ratio of the reflected sound is increased as the distance between the wearer and the other person becomes long. In this case, the phase difference when the direct sound is captured in the microphones 11 and 12 is approximately constant, whereas the phase difference when the reflected sound is captured in the microphones 11 and 12 is scattered. Accordingly, as the distance between the wearer and the other person is long, the ratio of the reflected sound is increased, and thus, the level of irregularity of the phase difference is increased as shown in FIGS. 9A to 9C.

That is, by checking dispersion that is the level of irregularity of the phase difference as shown in FIGS. 9A to 9C, it is possible to derive the distance L.

Figure 10A:
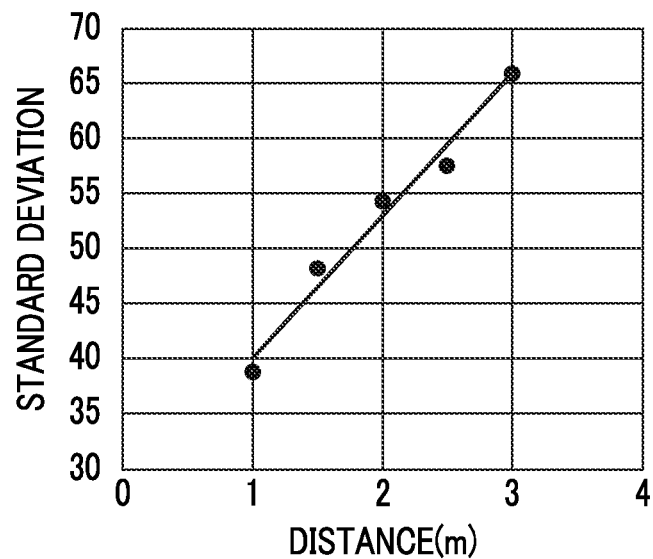
FIG. 10A is a diagram showing a relationship between a distance and a dispersion of a phase difference.

FIG. 10A is a diagram illustrating a relationship between the distance L and dispersion of the phase difference. Here, the transverse axis represents the distance L, and the longitudinal axis represents a standard deviation as the dispersion of the phase difference.

It can be understood from FIG. 10A that the distance L and the standard deviation are correlated. Accordingly, it is possible to derive the standard deviation as the dispersion of the phase difference, and to derive therefrom the distance L.

The relationship between the distance L and the standard deviation varies according to the above-mentioned angle α formed by the wearer and the other person.

Figure 10B:
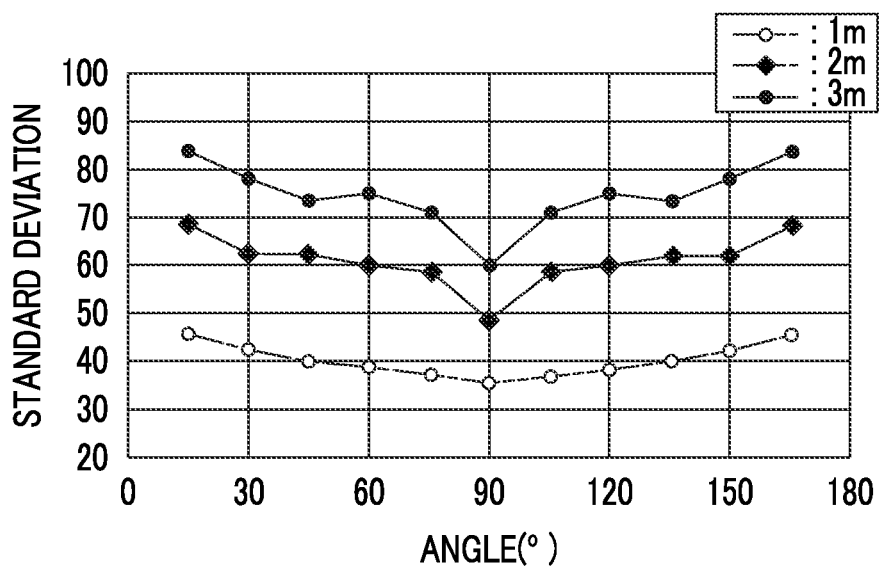
FIG. 10B is a diagram showing a relationship between an angle and a standard deviation according to a distance.

FIG. 10B is a diagram showing the relationship between the angle α and the standard deviation according to distances. Here, the transverse axis represents an angle, and the longitudinal axis represents a standard deviation.

In FIG. 10B, the relationship between the angle and the standard deviation in each of cases where the distance L is 1 m, 2 m and 3 m is shown. Here, a case where the angle is 90° represents where the other person is present in front of the wearer. Further, in a case where the angle α is 90°, the standard deviation is likely to be a minimum, and as the angle α is remote from 90', the standard deviation is likely to be increased.

Accordingly, when the distance L is derived, from the standard deviation, correction may be performed in consideration of the influence of the angle α.

In the present exemplary embodiment, the dispersion deriving section 155 derives a dispersion that is the level of irregularity of the phase difference derived by the phase difference deriving section 153. In the present exemplary embodiment, the standard deviation is used as the dispersion of the phase difference, but is not limited thereto, and various indexes such as a root-mean-square or variance may be used.

Further, in the present exemplary embodiment, the distance deriving section 156 derives the distance L between the wearer and the other person using the dispersion.

Further, the position determining section 157 determines the position of the other person with respect to the wearer from the derived distance IL and the angle α.

However, in the above-described derivation method of the distance L, a problem arises that it is difficult to cope with a case where an environment of the wearer and the other person is changed. That is, the strength or the like of the reflected sound is changed according to the size of a room or the like where the wearer and the other person are present or echo characteristics. In this case, the above-described dispersion of the phase difference is also changed according to the environmental change. Thus, in order to more accurately derive the distance L, it is necessary to know how the dispersion of the phase difference is changed according to environments. Further, in the related art, it is necessary to prepare data as shown in FIGS. 10A and 10B according to the environmental change, and it is necessary to measure the data in advance for each room and to create a data table form.

In the present exemplary embodiment, it is not necessary to prepare the data as shown in FIGS. 10A and 10B for each environment, and a method of measuring the distance L been the wearer and the other person by a convenient method is realized by employing the following method.

In the present exemplary embodiment, first, the dispersion deriving section 155 derives a first dispersion that is a dispersion in a case where a sound is distinguished as a spoken voice of another person, and a second dispersion that is a dispersion in a case where a sound is distinguished as a spoken voice of a wearer. More specifically, with respect to the sound distinguished as the spoken voice of the other person in the distinguishing section 152, the dispersion deriving section 155 derives the standard deviation of the phase difference as she first dispersion. Further, with respect to the sound distinguished as the spoken voice of the wearer in the distinguishing section. 152, the dispersion deriving section 155 derives the standard deviation of the phase difference as the second dispersion.

Here, the standard deviation derived as the second dispersion is obtained by reflecting the environment of the room where the wearer and the other person are present. That is, since the standard deviation derived as the first dispersion is based on the spoken voice of the other person, as described above, if the distance L between the wearer and the other person, the angle α, and the environment of the room where the wearer and the other person are present are changed, the standard deviation is changed. On the other hand, the standard deviation derived as the second dispersion is based on the spoken voice of the wearer. Here, the positional relationship of the distances between the wearer's mouth and the microphones 11 and 12 is determined in advance as shown in FIG. 2. Thus, with respect so the standard deviation derived as the second dispersion, a value that reflects the environment of the room where the wearer and the other person are present is obtained without the necessity of considering the change in the distance L or the angle α.

Accordingly, the correction of the standard deviation derived as the first deviation is performed using the standard deviation derived as the second dispersion. In reality, a correction formula determined by the value of the standard deviation derived as the second dispersion is prepared, and the correction formula is applied to the standard deviation derived as the first dispersion to perform the correction. Thus, the distance L is derived using the standard deviation after the correction and then using the data as shown in FIGS. 10A and 10B.

As described above, in the present exemplary embodiment, she distance deriving section 156 corrects the first dispersion using the second dispersion, and then, derives the distance L between the wearer and the other person using the first dispersion after the correction. Thus, it is not necessary to prepare the data as shown in FIGS. 10A and 10B based on the environmental change, and it is possible to measure the distance L between the wearer and the other person by a convenient method, and to derive the distance L with high accuracy.

Operation Example of Terminal Apparatus

FIG. 11 is a flowchart showing an operation of the terminal apparatus 10 according to the present exemplary embodiment.

As shown in FIG. 11, if the microphones 11 and 12 of the terminal apparatus 10 acquire a sound, electric signals (sound signals) based on the acquired sounds from the respective microphones 11 and 12 are transmitted to the first amplifier 13 and the second amplifier 14 (step 101). If the first amplifier 13 and the second amplifier 14 acquire the sound signals from the microphones 11 and 12, the first amplifier 13 and the second amplifier 14 amplify the sound signals and transmit the amplified signals to the sound analyzer 15 (step 102).

The sound analyzer 15 acquires the sound signals amplified in the first amplifier 13 and the second amplifier 14 in the sound information obtaining section 151 (step 103).

Next, the distinguishing section 152 of the sound analyzer 15 distinguishes whether the sound is the spoken voice of the wearer or the spoken voice of the other person from the sound pressure ratio of the sound acquired by the microphones 11 and 12 by the method described referring to FIGS. 5 and 6 (step 104).

Then, the phase difference deriving section 153 of the sound analyzer 15 derives the phase difference spectrum as shown in FIG. 7 (step 105).

Further, if the acquired sound is distinguished as the spoken voice of the wearer in step 104 (Yes in step 106), the dispersion deriving section 155 of the sound analyzer 15 derives the standard deviation that is the level of irregularity of the phase difference in the phase difference spectrum derived by the phase difference deriving section 153 (step 107).

Further, the distance deriving section 156 of the sound analyzer 15 determines the correction formula on the basis of the standard deviation derived in step 107 (step 108).

On the other hand, if the acquired sound is distinguished as the spoken voice of the other person in step 104 (No in step 106), the angle deriving section 154 of the sound analyzer 15 derives the inclination of the straight line that represents the relationship between the frequency and the phase difference in the phase difference spectrum, and derives the angle α formed by the wearer and the other person from the inclination (step 109).

Further, the dispersion deriving section 155 derives the standard deviation that is the level of irregularity of the phase difference in the phase difference spectrum derived by the phase difference deriving section. 153 (step 110).

Next, the distance deriving section 156 performs correction for the standard deviation derived in step 110 using the correction formula determined in step 108 (step 111). Here, as described referring to FIG. 10B, the correction may be performed in consideration of the influence of the standard deviation due to the angle α.

Next, the distance deriving section 156 derives the distance L between the wearer and the other person using the standard deviation after correction (step 112).

Further, the position determining section 157 of the sound analyzer 15 determines the position of the other person from the derived distance L and the angle α (step 113).

Then, the sound analyzer 15 transmits the information obtained in the processes of steps 104 to 113 to the host apparatus 20 as an analysis result through the data transmitter 16 (step 114). The analysis result may include, for example, the presence or absence of utterance, wearer information (terminal ID), distinction information that is information indicating that the sound acquired by the microphones 11 and 12 is distinguished as the spoken voice of the wearer or the spoken voice of the other person, the position of the other person determined in step 113, and the like. Further, here, the length of utterance time according to respective speakers (wearer or another person), a gain value of average sound pressure, and other additional information as well, as the analysis result may be transmitted to the host apparatus 20.

(Second Exemplary Embodiment)

Next, a detailed configuration and an operation of a second exemplary' embodiment will be described.

System Configuration Example

Figure 12:
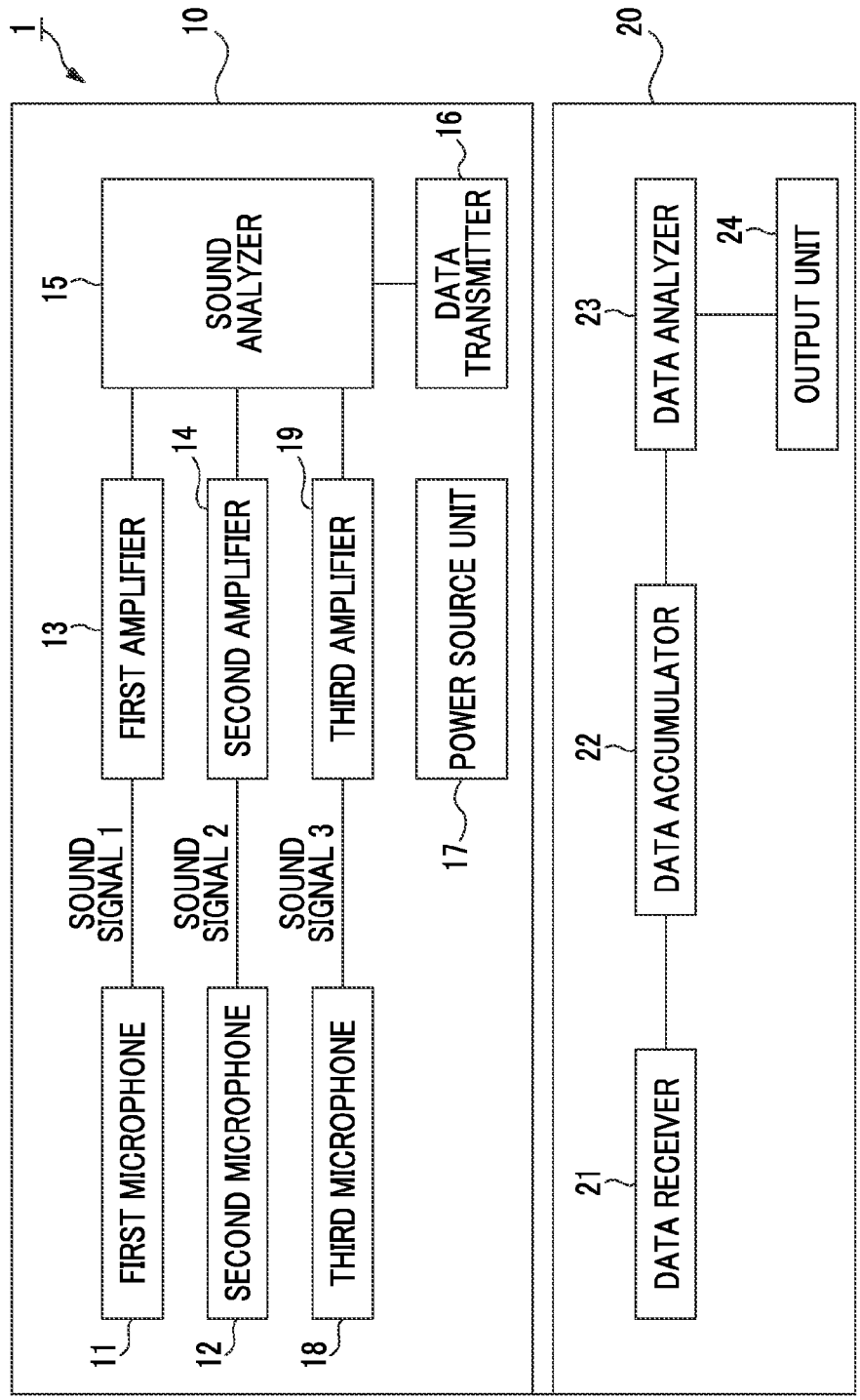
FIG. 12 is a diagram showing a configuration example of a sound analysis system according to a second exemplary embodiment.

FIG. 12 is a diagram showing a configuration example of a sound analysis system according to the second exemplary embodiment. Further, FIG. 13 is a diagram showing a configuration example of a terminal apparatus 10 according to the second exemplary embodiment.

The sound analysis system 1 shown in FIG. 12 is different from the sound analysis system 1 shown in FIG. 1 in that a third microphone 18 and a third amplifier 19 are further provided.

Figure 13:
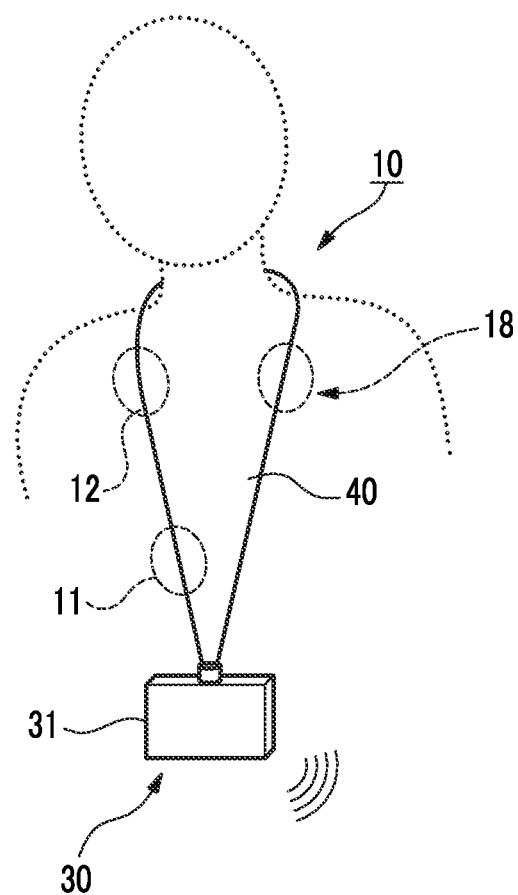
FIG. 13 is a diagram showing a configuration example of a terminal apparatus according to the second exemplary embodiment.

As shown in FIG. 13, the third microphone 18 is disposed at a position close to the wearer's mouth (utterance portion) in a similar way to the second microphone 12. Further, in a similar way to the first microphone 11 and the second microphone 12, the third microphone 18 is accommodated inside a strap 40. Here, the third microphone 18 is disposed on an opposite side to the second microphone 12 with the wearer's mouth (utterance portion) being interposed therebetween.

That is, the second microphone 12 and the third microphone 18 are in a symmetric relationship with respect to the wearer's mouth (utterance portion).

The third amplifier 19 has the same function as those of the first amplifier 13 and the second amplifier 14, and amplifies an electric signal (sound signal) output according to a sound acquired by the third microphone 18.

Derivation of Angle β

In the sound analysis system 1 according to the present exemplary embodiment, a spoken voice of the wearer or the other person is acquired by the second microphone 12 and the third microphone 18. Further, an angle 3 that represents the direction of the wearer is also derived by the method described in the first exemplary embodiment.

Further, the position of the other person is derived using the angle α that represents the direction of the wearer with respect to the first microphone 11 and the second microphone 12 and the angle β that represents the direction of the wearer with respect so the second microphone 12 and the third microphone 18. Thus, it is possible to derive the position of the other person with higher accuracy.

In addition, in many cases, the wearer and the other person are generally positioned at approximately the same height. Thus, in many cases, it is favorable that the angle used in derivation of the position of the other person with respect to the wearer uses an angle (angle in the horizontal plane) formed by the wearer and the other person from the top. Thus, it is more preferable to use the angle β rather than the angle α.

Derivation of Distance

It is possible to derive the distance between the wearer and the other person using the second microphone 12 and the third microphone 18. Here, it is more preferable to derive the distance L between the wearer and the other person using the first microphone 11 and the second microphone 12 as in the first exemplary embodiment, due to the following reason.

Figure 14A:
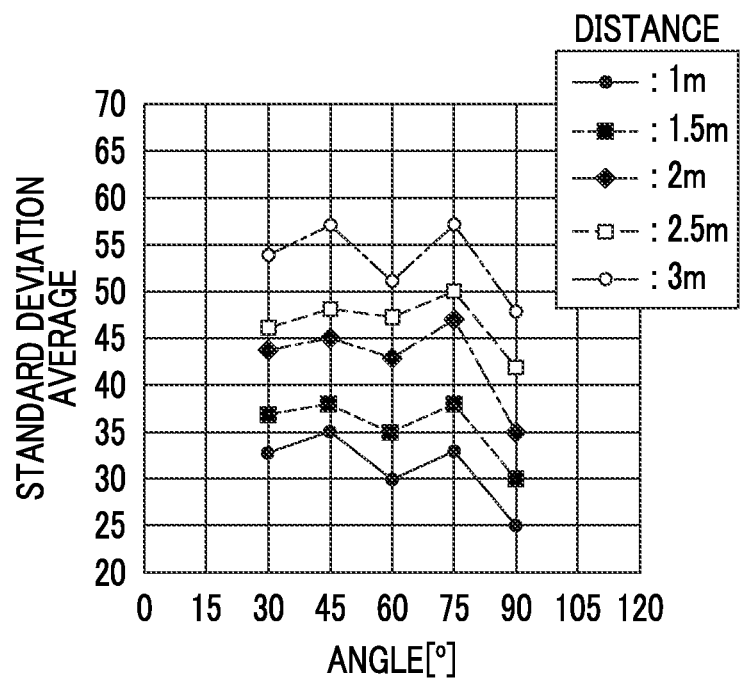
FIGS. 14A and 14B are diagrams showing a relationship between an angle, a distance between a wearer and another person, and a standard deviation in a case where a second microphone and a third microphone are used.
Figure 14B:
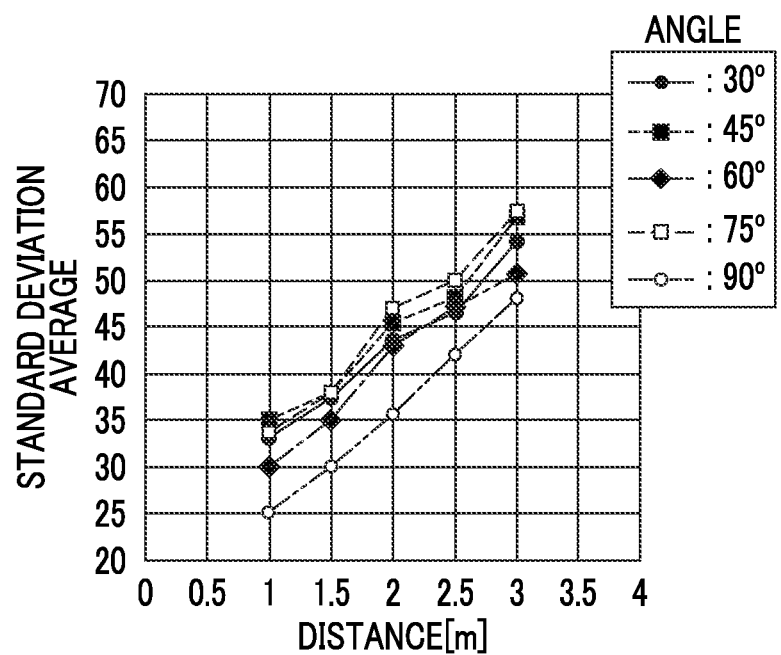
Figure 15A:
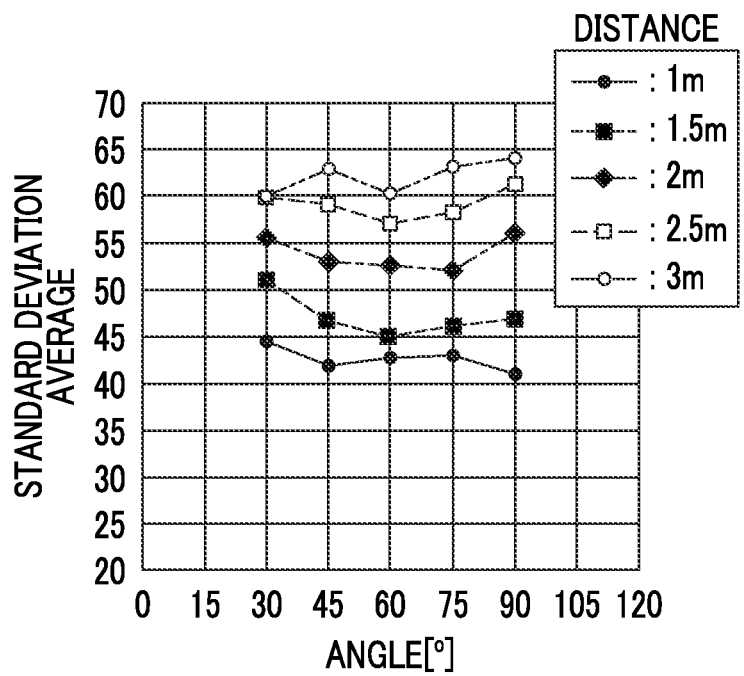
FIGS. 15A and 15B are diagrams showing a relationship between an angle, a distance between a wearer and another person, and a standard deviation in a case where a first microphone and the second microphone are used.
Figure 15B:
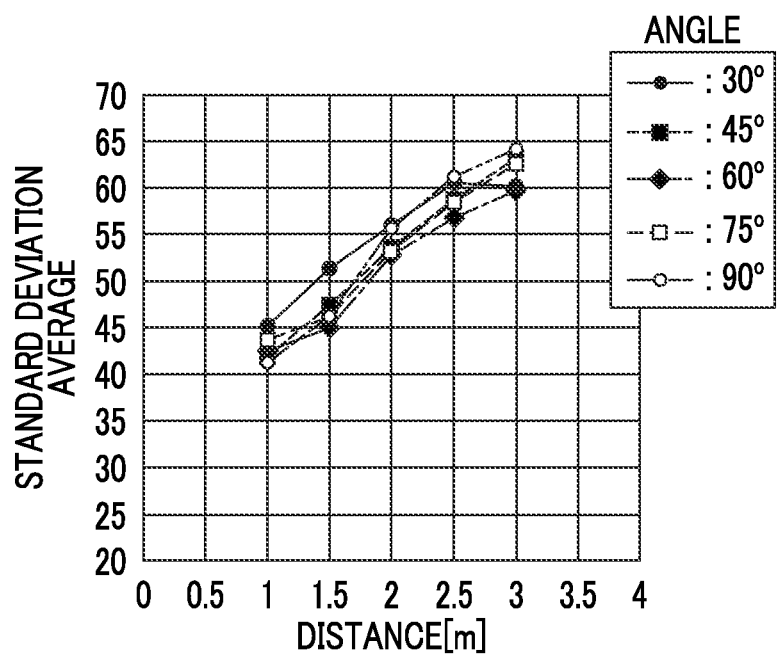

FIGS. 14A and 14B are diagrams illustrating a relationship between the angle β, the distance between the wearer and the other person, and the standard derivation in a case where the second microphone 12 and the third microphone 18 are used. Further, FIGS. 15A and 15B are diagrams showing a relationship between the angle α, the distance between the wearer and the other person, and the standard deviation in a case where the first microphone 11 and the second microphone 12 are used. FIGS. 15A and 15B are diagrams having the same meaning as in FIGS. 10A and 10B, but show different results due to different measurement environments from each other.

Here, when FIG. 14B is compared with FIG. 15B, it can be understood that the dependence of the standard deviation due to the angle is weaker in FIG. 15B. That is, even though the angle is changed, the relationship between the distance and the standard deviation is not changed very much.

For this reason, in a case where the first microphone 11 and the second microphone 12 are used, the necessity of performing correction using the angle α is decreased. On the other hand, in a case where the second microphone 12 and the third microphone 18 are used, the necessity of performing correction using the angle β is increased. Thus, it is necessary to prepare plural correction formulas due to the angle β, which complicates derivation of the distance between the wearer and the other person.

It is considered that this difference occurs due to the influence of a reflected sound in the room where the wearer and the other person are present. That is, in a case where the microphones disposed on the left and right sides as in the second microphone 12 and the third microphone 18 are used, the time when a reflected sound reflected on walls that are positioned on the left and right sides of the wearer and the other person reaches the microphones is changed as the angle β is changed. Thus, due to the influence of the reflected sound reflected on the walls, the standard deviation with respect to the angle β is easily changed. On the other hand, in a case where the microphones that are vertically disposed as in the first microphone 11 and the second microphone 12 are used, the time when the reflected sound reflected on the walls that are positioned on the left and right sides of the wearer and the other person reaches becomes approximately she same time irrespective of the change of the angle β. Thus, the influence of the reflected sound reflected on the walls is hardly present. Even in a case where the microphones that are vertically disposed as in the first microphone 11 and the second microphone 12 are used, it is considered that the influence of the reflected sound due to the ceiling or floor of a room is present. Here, the distances between the wearer or the other person and the ceiling or floor of the room is approximately constant. On the other hand, the distance between the wearer or the other person and the wall of the room has various values. Thus, when the two cases are compared with each other, a case where the microphones are disposed on the left and right sides is easily affected by the reflected sound, compared with a case where the microphones are vertically disposed. Accordingly, it is considered that the angle dependence of the relationship between the distance and the standard deviation is not very severe in a case where the first microphone 11 and she second microphone 12 are used.

Summarizing the above description, in the terminal apparatus 10 shown in FIG. 13, it is preferable that the distance L between the wearer and the other person be derived on the basis of the information relating to the sound acquired by the microphones 11 and 12 that are disposed while being vertically separated from each other by a predetermined distance.

On the other hand, it is preferable that the angle β formed by the wearer and the other person be derived on the basis of the information relating to the sound acquired by the microphones 12 and 18 that are disposed while being laterally separated from each other by a predetermined distance, and the position of the other person with respect to the wearer be derived using the angle β and the distance IL. Further, if the above-described angle α is used, the accuracy when the position of the other person with respect to the wearer is more improved.

In the above-described example, the process of determining the position of the other person with respect to the wearer is performed by the terminal apparatus 10, but is not limited thereto, and may be performed by the host apparatus 20. With respect to the system shown in FIG. 1 as the sound analysis system 1 according to the present exemplary embodiment, the process performed by the sound information obtaining section 151 among the respective processes performed by the sound analyzer 15 is performed by the data receiver 21 of the host apparatus 20. Further, the functions performed by the distinguishing section 152, the phase difference deriving section 153, the angle deriving section 154, the dispersion deriving section 155, the distance deriving section 156 and the position determining section. 157 may be performed by the data analyzer 23 of the host apparatus 20, for example. In this case, the host apparatus 20 may be considered as an example of the sound analysis apparatus according to the present exemplary embodiment. The sound information obtaining section 151, the distinguishing section 152, the phase difference deriving section 153, the angle deriving section 154, the dispersion deriving section 155, the distance deriving section 156 and the position determining section 157 may not be disposed in only one of the terminal apparatus 10 and the host apparatus 20, but may be separately disposed in both of the terminal apparatus 10 and the host apparatus 20.

Description about Program

The process performed by the terminal apparatus 10 or the host apparatus 20 according to the present exemplary embodiment described referring to FIGS. 1 and 12 is realized by cooperation of software and hardware. That is, a CPU (not shown) in a control computer installed in the terminal apparatus 10 or the host apparatus 20 executes a program that realizes the respective functions of the terminal apparatus 10 or the host apparatus 20 to realize the respective functions.

Accordingly, the above-described process performed by the terminal apparatus 10 or the host apparatus 20 may be considered as a program that causes a computer to execute functions including: a function of obtaining information relating to a sound acquired by a microphone that acquires the sound and distinguishes a spoken voice of a wearer from a spoken voice of another person; a function of calculating a relationship between a frequency and a phase difference with respect to the sound acquired by the plural microphones; a function of deriving a dispersion that is the level of irregularity of the derived phase difference; and a function of deriving a distance between the wearer and the other person using a first dispersion that is the dispersion derived in a case where the sound is distinguished as the spoken voice of the other person and a second dispersion that is the dispersion derived in a case where the sound is distinguished as the spoken voice of the wearer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sound analysis apparatus comprising:
a sound information obtaining section that obtains information relating to a sound acquired by a plurality of sound acquiring sections that acquires the sound and distinguishes a spoken voice of a wearer from a spoken voice of another person, the plurality of sound acquiring sections being vertically separated from each other by a predetermined distance;
a phase difference deriving section that derives a relationship between a frequency and a phase difference with respect to the sound acquired by the plurality of sound acquiring sections, and derives a distance between the wearer and the other person on a basis of the information relating to the sound acquired by the sound acquiring sections;
a dispersion deriving section that derives a dispersion that is a level of irregularity of the phase difference derived by the phase difference deriving section; and
a distance deriving section that derives the distance between the wearer and the other person using a first dispersion that is derived by the dispersion deriving section in a case where the sound is distinguished as the spoken voice of the other person and a second dispersion that is derived by the dispersion deriving section in a case where the sound is distinguished as the spoken voice of the wearer.

2. The sound analysis apparatus according to claim 1, wherein the distance deriving section corrects the first dispersion using the second dispersion, and derives the distance between the wearer and the other person using the first dispersion after the correction.

3. The sound analysis apparatus according to claim 1, further comprising:
an angle deriving section that derives an angle formed by the wearer and the other person on a basis of the information relating to the sound acquired by the sound acquiring sections that are laterally separated from each other by a second predetermined distance.

4. A sound analysis system comprising:
a processor configured to act as:
a plurality of sound acquiring sections that acquires a sound, the plurality of sound sections being vertically separated from each other by a predetermined distance;
a distinguishing section that distinguishes whether the sound acquired by the sound acquiring sections is a spoken voice of a wearer or a spoken voice of another person;
a phase difference deriving section that derives a relationship between a frequency and a phase difference with respect to the sound acquired by the plurality of sound acquiring sections, and derives a distance between the wearer and the other person on a basis of information relating to the sound acquired by the sound acquiring sections;
a dispersion deriving section that derives a dispersion that is a level of irregularity of the phase difference derived by the phase difference deriving section; and
a distance deriving section that derives the distance between the wearer and the other person using a first dispersion that is derived by the dispersion deriving section in a case where the sound is distinguished as the spoken voice of the other person and a second dispersion that is derived by the dispersion deriving section in a case where the sound is distinguished as the spoken voice of the wearer.

5. A non-transitory computer readable medium storing a program causing a computer to achieve functions, the functions comprising:
obtaining information relating to a sound acquired by a plurality of sound acquiring sections that acquires the sound and distinguishes a spoken voice of a wearer from a spoken voice of another person, the plurality of sound acquiring sections being vertically separated from each other by a predetermined distance;
deriving a relationship between a frequency and a phase difference with respect to the sound acquired by the plurality of sound acquiring sections;
deriving a dispersion that is a level of irregularity of the derived phase difference; and
deriving a distance between the wearer and the other person on a basis of the information relating to the sound acquired by the sound acquiring sections, and using: a first dispersion that is derived in a case where the sound is distinguished as the spoken voice of the other person; and a second dispersion that is derived in a case where the sound is distinguished as the spoken voice of the wearer.

* * * * *